United States Patent
Wei

(10) Patent No.: US 8,561,150 B2
(45) Date of Patent: Oct. 15, 2013

(54) METHOD AND SYSTEM FOR SUPPORTING MOBILITY SECURITY IN THE NEXT GENERATION NETWORK

(75) Inventor: Yinxing Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 374 days.

(21) Appl. No.: 12/999,282

(22) PCT Filed: Jun. 24, 2009

(86) PCT No.: PCT/CN2009/072433
§ 371 (c)(1),
(2), (4) Date: Dec. 15, 2010

(87) PCT Pub. No.: WO2009/155863
PCT Pub. Date: Dec. 30, 2009

(65) Prior Publication Data
US 2011/0093932 A1      Apr. 21, 2011

(30) Foreign Application Priority Data

Jun. 24, 2008   (CN) .......................... 2008 1 0126514

(51) Int. Cl.
*G06F 21/00*   (2013.01)
(52) U.S. Cl.
USPC .............................................. 726/4; 455/436
(58) Field of Classification Search
None
See application file for complete search history.

(56) References Cited

U.S. PATENT DOCUMENTS

| 2007/0280482 | A1* | 12/2007 | Yan et al. ....................... 380/278 |
| 2008/0259850 | A1* | 10/2008 | Dai ................................. 370/328 |
| 2010/0146610 | A1* | 6/2010 | Kim et al. .......................... 726/7 |
| 2011/0078442 | A1* | 3/2011 | Gong et al. ..................... 713/168 |
| 2011/0173689 | A1* | 7/2011 | Kim et al. .......................... 726/8 |
| 2012/0106734 | A1* | 5/2012 | Wang et al. ................... 380/247 |

FOREIGN PATENT DOCUMENTS

| CN | 1658547 A | 8/2005 |
| CN | 1658552 A | 8/2005 |
| CN | 101321395 A | 12/2008 |
| KR | 10-2005-040047 | 5/2005 |

* cited by examiner

*Primary Examiner* — Hadi Armouche
(74) *Attorney, Agent, or Firm* — DASCENSO Intellectual Property Law, P.C.

(57) ABSTRACT

A method and system for supporting mobility security in a next generation network are provided. A Transport Authentication and Authorization Functional Entity (TAA-FE) and a mobile agent functional entity are configured in the network, and a reference point for transmitting key material is established between the TAA-FE and the mobile agent functional entity; when a terminal moves, the mobile agent functional entity receives the key material from the TAA-FE, and performs security protection for signaling between the terminal and the mobile agent functional entity.

8 Claims, 4 Drawing Sheets

METHOD AND SYSTEM FOR SUPPORTING MOBILITY SECURITY IN THE NEXT GENERATION NETWORK

TECHNICAL FIELD

The present invention relates to the Next Generation Network technology in the communication field, and in particular, to a method and system supporting mobility security in the Next Generation Network.

BACKGROUND OF THE INVENTION

The Next Generation Network (NGN) is a network integrating fixed communication with mobile communication, and supports a plurality of access technologies such as Cable, Digital Subscriber Line (xDSL), 802.11 Wireless Local Access Network (WLAN), 802.16 Wireless Metropolitan Access Network (WMAN), and the Third Generation Radio Access Network (3G RAN), etc. The NGN is required to support mobility including nomadism and roaming. Mobility may occur within an access network, or may occur across access networks. These access networks may be homogeneous or heterogeneous. Mobile Internet Protocol (MIP) supports mobility across sub-networks, regardless of the access technology on bottom layer. Therefore, MIP is one of the important solutions to mobility in heterogeneous access.

MIP is an important technology supporting mobility of equipment and can support globally roaming of mobile nodes and maintain the continuity of services. The MIP technology is classified into two categories: host-based mobility, i.e., the traditional Mobile IPv4 and Mobile IPv6, and Dual-Stack Mobile IPv4 and Dual-Stack Mobile IPv6; and network-based mobility, i.e., Proxy Mobile IPv4 and Proxy Mobile IPv6. The host-based MIP system is typically composed of a Mobile Node (MN), a Foreign Agent (FA) and a Home Agent (HA). The network-based MIP system is typically composed of an MN, a Mobile Access Gateway (MAG), and a Local Mobility Anchor (LMA). The HA/LMA typically authenticates MIP signaling received to ensure its integrity.

NGN is an IP-based network, and faces greater security threats compared with the traditional telecommunication network. As mentioned above, NGN is required to support mobility technologies on transport layer, such as MIP technology, and thus it is necessary to solve the security problems, such as authentication and key negotiation, MIP signaling security, and security in handover, in mobility on transport layer in NGN.

So far, the mobility security on transport layer has not yet been involved in NGN.

SUMMARY OF THE INVENTION

The technical problem to be solved by the present invention is to provide a method and system for realizing transport layer mobility security in NGN to ensure the security of transport layer mobility in the NGN.

To solve the above problem, the present invention provides a method for supporting mobility security in a next generation network, comprising:

configuring a Transport Authentication and Authorization Functional Entity (TAA-FE) and a mobile agent functional entity in the network, and establishing a reference point for transmitting key material between the TAA-FE and the mobile agent functional entity; and when a terminal moves, the mobile agent functional entity receiving the key material from the TAA-FE, and performing security protection for signaling between the terminal and the mobile agent functional entity.

Furthermore, the mobile agent functional entity comprises a Mobile Access Functional Entity (MA-FE) and a Mobile Home Functional Entity (MH-FE).

Furthermore, when the terminal moves, terminal customer premises equipment attaches to the network, the attachment comprising:

a step of authentication and authorization: the terminal initiating an authentication and authorization request and providing a credential to the TAA-FE; the TAA-FE inquiring user profile information of a Transport User Profile Functional Entity (TUP-FE), and authenticating the terminal according to the user profile information; if the authentication succeeds, the TAA-FE sending a key to the MH-FE and MA-FE; and the MH-FE establishing mobile security association with the terminal;

a step of Internet Protocol (IP) configuration: the TAA-FE returning an authentication and authorization response to the terminal, the authentication and authorization response containing a random value from which the terminal derives the key, a dynamic Home Address (HoA), and a Home Agent (HA); the terminal acquiring a Care-of Address (CoA);

a step of location management: the terminal registering location information to a Transport Location Management Functional Entity (TLM-FE), and the TLM-FE sending the information to a Resource Admission Control Function (RACF); and a step of tunnel establishment: the terminal constructing a Registration Request (RRQ) message according to a Network Access Identifier (NAI) and the CoA and HoA, and registering binding to the MH-FE; the MH-FE authenticating Mobile IP (MIP) signaling of the terminal according to the key sent by the TAA-FE, and after the authentication is passed, the MH-FE notifying the TLM-FE of a current tunnel state and sending a MIP Registration Reply (RRP) message to the terminal via the MA-FE.

Preferably, in the step of authentication and authorization, the credential provided by the terminal to the TAA-FE contains a shared key and a digital certificate.

Preferably, in the step of IP configuration, the terminal acquires the CoA by one of the following approaches:

a Network Access Configuration Functional Entity (NAC-FE) allocating an IP address, which is a coexistent CoA, to the terminal;

the terminal acquiring a foreign agent CoA by interchanging an MIP request or announcement message with the MA-FE.

Furthermore, in the step of tunnel establishment, after the TLM-FE receives the current tunnel state sent by the MH-FE, the TLM-FE sends the profile information to the RACF.

Preferably, the profile information comprises any one or combination of key material, HoA, HA, authentication and authorization, IP configuration and location.

The present invention also provides a system supporting mobility security in a next generation network, comprising:

a Transport User Profile Functional Entity (TUP-FE), configured to store user profile information;

a Transport Authentication and Authorization Functional Entity (TAA-FE), configured to inquire user profile information of the TUP-FE after receiving an authentication and authorization request from a terminal, and to authenticate and authorize the terminal according to the inquired user profile information; and a mobile agent functional entity, configured to acquire key material from the TAA-FE and perform security protection for signaling of the terminal according to the key material.

Furthermore, the mobile agent functional entity comprises a Mobile Access Functional Entity (MA-FE) and a Mobile Home Functional Entity (MH-FE), and wherein the MA-FE is configured to provide a Care-of Address (CoA) to the terminal and provide a routing service for the terminal;

to forward Mobile Internet Protocol (MIP) signaling of the terminal and authenticate the terminal; and when the terminal is in active state, to interact with a Resource Admission Control Function (RACF) to request resources;

the MH-FE is configured to send messages to a terminal away from home and maintain binding information of the terminal;

when the terminal access requires a dynamic home address and an MH-FE address, to provide the dynamic home address and MH-FE address to the TAA-FE;

to request key material from the TAA-FE to accomplish authentication of MIP signaling of the terminal or MA-FE;

to notify a Transport Location Management Functional Entity (TLM-FE) of tunnel establishment information after creating a binding record; and when the terminal is in active state, to interact with the RACF to request resources.

Preferably, the user profile information comprises any one or combination of key material, HoA, HA, authentication and authorization, IP configuration and location.

The present invention configures a transport authentication and authorization functional entity and a mobile agent functional entity in the network, and defines a reference point between the transport authentication and authorization functional entity and the mobile agent functional entity to transfer a key, and the mobile agent functional entity requests key material from the transport authentication and authorization functional entity and performs security protection for signaling of a terminal according to the key material, thereby ensuring mobility security on transport layer in the NGN.

PREFERRED EMBODIMENTS OF THE PRESENT INVENTION

The present invention configures a transport authentication and authorization functional entity and a mobile agent functional entity in a network architecture, defines a reference point between the transport authentication and authorization functional entity and the mobile agent functional entity to transfer a key, and protects the signaling of a terminal by the mobile agent functional entity, so as to ensure the mobility security on transport layer.

The present invention will be further described in detail in conjunction with the accompanying figures and specific embodiments, in order that those skilled in the art can better understand the present invention and implement it. However, the embodiments described are not intended to limit the present invention.

Figure 1:
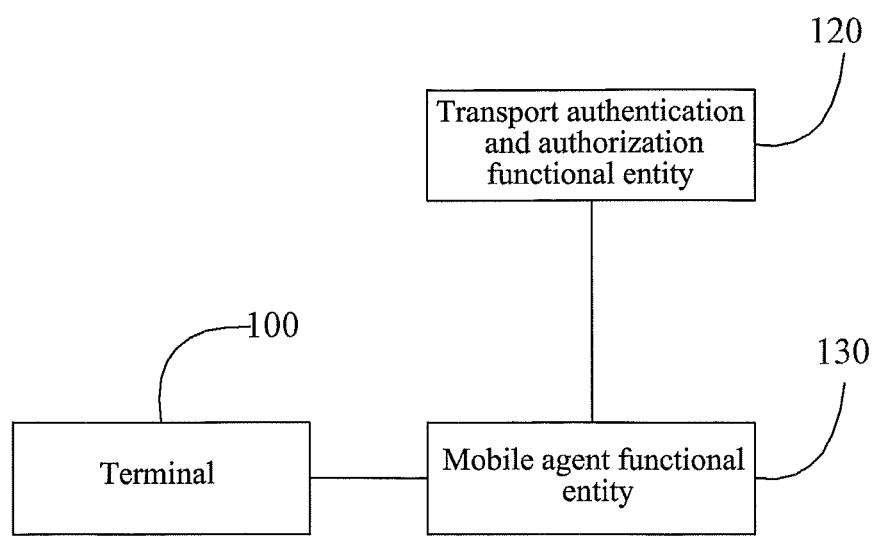
FIG. 1 illustrates a framework supporting mobility security in NGN according to the present invention.

FIG. 1 illustrates a framework supporting mobility security in NGN according to the present invention. As shown in FIG. 1, A terminal 100 has the same root key with a transport authentication and authorization functional entity 120, and a key related to establishment of security association can be derived from the root key. The transport authentication and authorization functional entity 120 transfers the key material to the mobile agent functional entity 130 so that the mobile agent functional entity 130 can implement security check of the mobile signaling of the terminal 100. The transport authentication and authorization functional entity 120 may further be divided into an authentication and authorization agent and an authentication and authorization server, and the mobile agent functional entity 130 may further be divided into a foreign agent and a home agent, wherein the foreign agent is a mobile access functional entity and the home agent is a mobile home functional entity.

As mentioned before, the host-based mobility system comprises: a Mobile Node (MN), a Foreign Agent (FA), and a Home Agent (HA), wherein the MN supports network layer mobility function. The network-based mobility system comprises: an MN, a Mobile Access Gateway (MAG), and a Local Mobile Anchor (LMA), wherein the MN is not required to support the capability of MIP. The FA/MAG is located in an access network and is the first-hop router of a MN; the HA/LMA is located in the core network.

Figure 2:
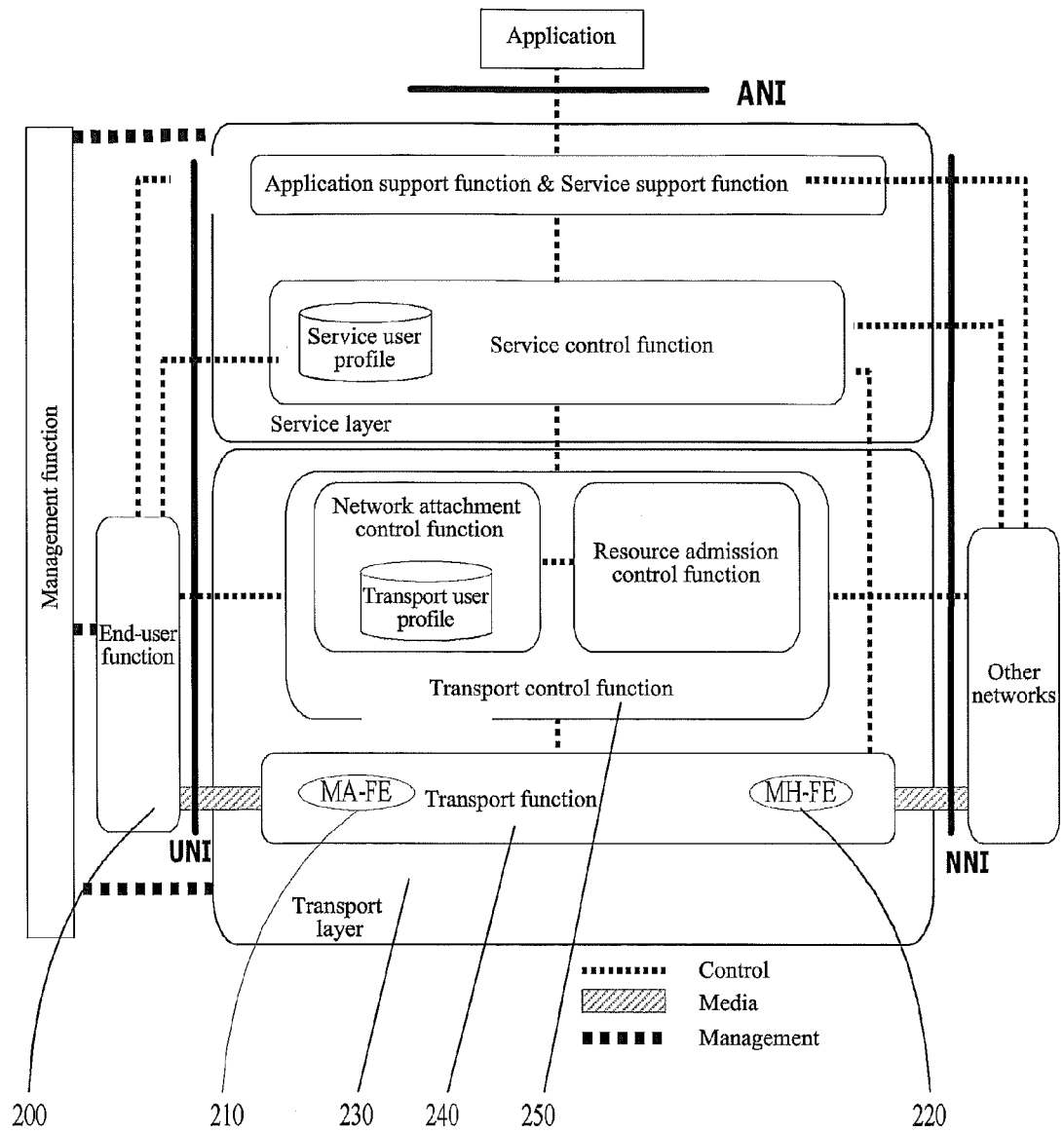
FIG. 2 illustrates locations of functional entities supporting transport layer mobility in NGN according to the present invention.

FIG. 2 illustrates the locations of functional entities supporting transport layer mobility in NGN according to the present invention. The NGN transport layer 230 provides a function of transmitting data and a function of controlling and managing transport resources carrying the data, wherein the carried data itself may be information on user plane, control plane and management plane. The NGN transport layer comprises: a transport function 240 and a transport control function 250. The transport function 240 provides connections for all components and all physically separated functional entities in NGN, and comprises an access network function, a border function, a core transport function, and a gateway function. The transport function supports a function of message forwarding and routing. The transport control function 250 implements functions of attachment, parameter configuration, authentication and authorization, and location management of terminal equipment, and functions of admission control and resource control. In the case of host-based mobility, the Mobile Access Functional Entity (MA-FE) 210 in FIG. 2 is interpreted as FA, the Mobile Home Functional Entity (MH-FE) 220 in FIG. 2 is interpreted as HA, and in this case, the End-user Function 200 is required to support the mobility of Layer 3. In the case of network-based mobility, the MA-FE 210 and MH-FE 220 are interpreted as MAG and LMA respectively, and in this case, the End-user Function 200 is not required to support the mobility of Layer 3. Since the MA-FE 210 and MH-FE 220 are also responsible for transmitting data, it is reasonable to locate them on the transport function 240 of NGN. Of course, the MA-FE 210 and MH-FE 220 may also be located in other locations in the network, for example, the functions of MA-FE and MH-FE may be combined and placed on transport control layer. The MA-FE and MH-FE may be separate functional entities, or may extend the function of mobile agent on the functions of existing functional entities on transport function 240. The MH-FE 220 may be deployed in home network or visited network, depending on the operator's policy.

The MA-FE 210 and MH-FE 220 support MIP signaling and message transport, and the transport control function 250 of NGN may also participate in the MIP signaling process. In the case of host-based mobility, the MA-FE 210 is not necessary when the CoA (Care-of Address) coexists with the End-user Function 200.

Figure 3:
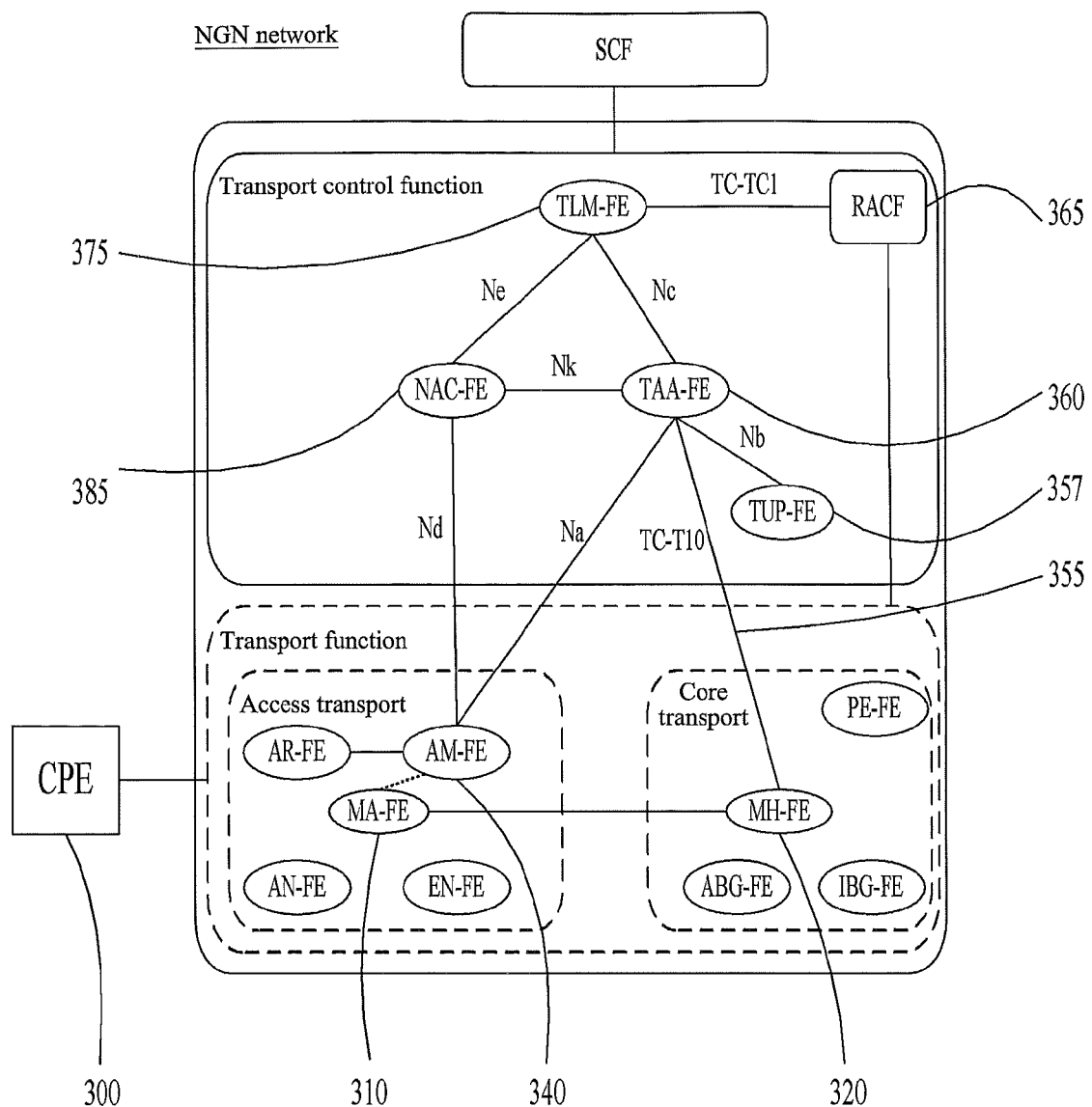
FIG. 3 illustrates an exemplary host-based mobility non-roaming scenario in NGN according to the present invention.

The basic flow for NGN to support network layer mobility comprises: an attachment flow, and a detachment and handover flow, and basic functions need to be executed comprises: authentication and authorization, IP configuration, location management and MIP signaling. NGN supporting network layer mobility requires participation of functional entities and interfaces on transport layer. FIG. 3 illustrates a non-roaming scenario of host-based mobility in NGN according to the present invention.

Terminal Customer Premises Equipment (CPE) 300 is equipment allowing users to visit NGN services, and corresponding to the afore-mentioned terminal 100 and End-user Function 200, the CPE 300 requires a function of supporting mobility of Layer 3. For MIPv4, the CoA may be provided by a Mobile Access Functional Entity (MA-FE) 310, or may be provided by a Network Access Configuration Functional Entity (NAC-FE) 385. For MIPv6, the CoA is merely provided by the NAC-FE 385. The CPE 300 and a Transport Authentication and Authorization Functional Entity (TAA-FE) 360 share a key.

The MA-FE 310 is configured to provide the CoA to the CPE 300 and provide a routing service for the CPE 300 in the case of MIPv4, and is also able to forward MIPv4 signaling of the CPE 300 and authenticate the CPE 300. When the CPE 300 is in active state, the MA-FE 310 interacts with a Resource Admission Control Function (RACF) 365 to request resources.

A Mobile Home Functional Entity (MH-FE) 320 is configured to send messages to the CPE 300 away from home and maintain binding information of the CPE 300. When CPE 300 access requires dynamic Home Address (HoA) and MH-FE address, the MH-FE can provide HoA and MH-FE address to TAA-FE 360. The MH-FE 320 can also request key material from the TAA-FE 360 to authenticate MIP signaling of the CPE 300 and/or MA-FE 310. After the MH-FE 320 creates a binding record, the MH-FE 320 notifies a Transport Location Management Functional Entity (TLM-FE) 375 of tunnel establishment information. When the CPE 300 is in active state, the MH-FE interacts with the RACF 365 to request resources.

The NAC-FE 385 is responsible for allocating an IP address and network configuration parameters for the CPE 300.

The TAA-FE 360 is responsible for authenticating and authorizing the CPE 300, providing HoA and MH-FE address to the CPE 300, and allocating key material for the MA-FE 310 and MH-FE 320. The CPE 300 derives a key by using a random number provided by the TAA-FE 360, and the key is used for an authentication extension option of the MIP message. The MH-FE 320 checks the integrity of MIP signaling according to the extension.

A Transport User Profile Functional Entity (TUP-FE) 357 stores user profile information, including user identity, authentication method, key material, HoA, and address information of the MH-FE 320, etc.

The Reference point TC-TC10 (Transport Control) 355 is configured to transfer information between the MH-FE 320 and TAA-FE 360. The MH-FE 320 can acquire key material from the TAA-FE 360 to authenticate the MIP control signaling of the CPE 300. When the HoA and the address of MH-FE 320 are acquired dynamically, the TAA-FE 360 can extract the HoA and/or MH-FE address from the MH-FE 320.

Further, both the MA-FE 310 and an Access Management Functional Entity (AM-FE) 340 may be used as RADIUS (Remote Authentication Dial In User Service)/Diameter Client or DHCP (Dynamic Host Configuration Protocol) Relay, therefore the MA-FE and the AM-FE are overlapped logically. For reusing the existing reference points of the AM-FE, an internal interface is required between the MA-FE and the AM-FE, or alternatively, the AM-FE coexists with the MA-FE.

Figure 4:
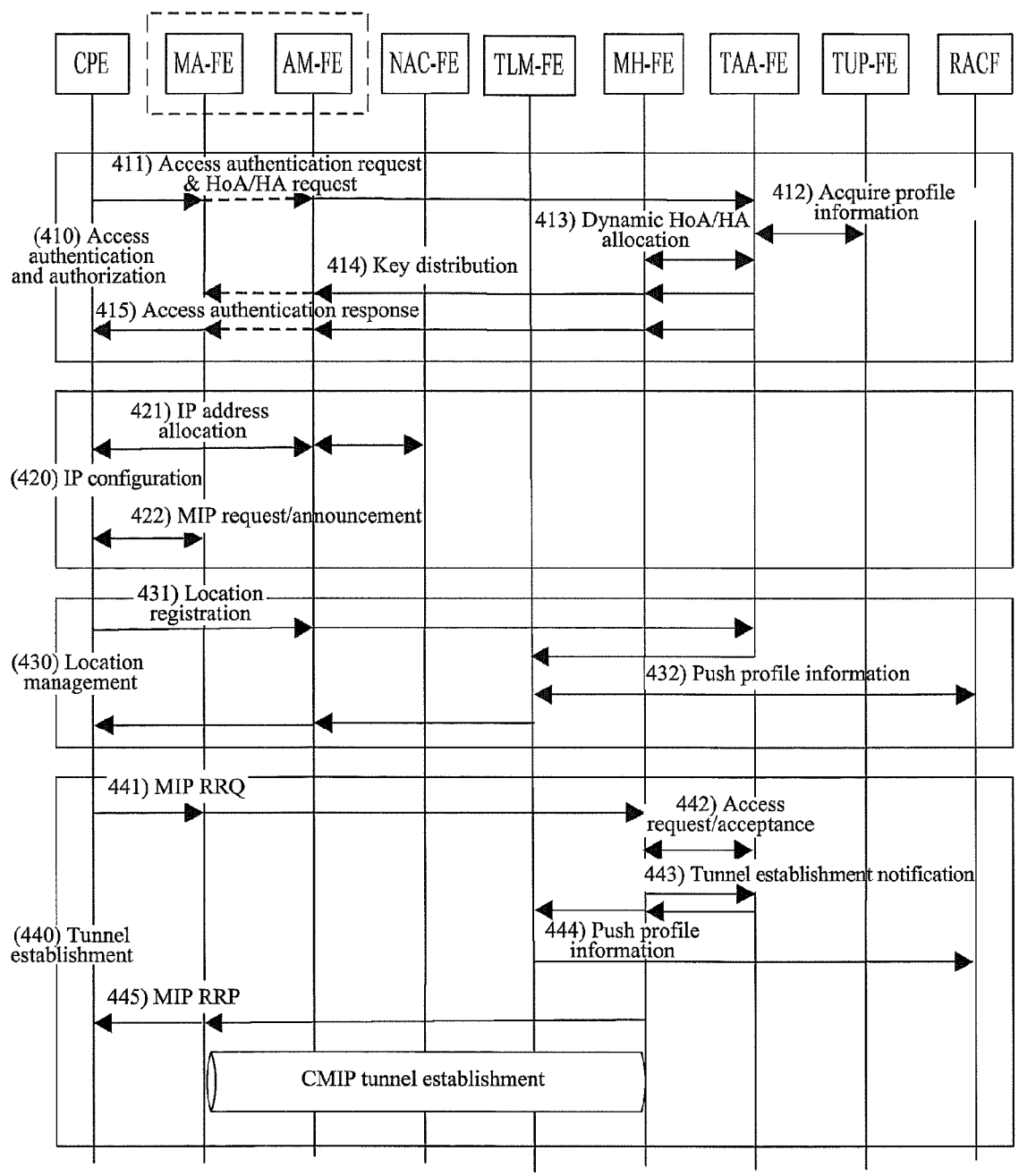
FIG. 4 illustrates a flow of an exemplary attachment method based on MIPv4 in NGN according to the present invention.

FIG. 4 illustrates an attachment method of the CPE in NGN in the case of MIPv4 according to the present invention, which mainly comprises the following steps:

Step 410, access authentication and authorization: user access is authenticated by transport user identifier, such as Network Access Identifier (NAI), an HoA and MH-FE address are allocated for the CPE, and a key is allocated to the MH-FE and MA-FE to establish Mobile Security Association (MSA) with the CPE;

Step 420, IP configuration: the NAC-FE or MA-FE allocates a CoA for the CPE;

Step 430, location management: the CPE registers location information to the TLM-FE, and then the information is pushed to the RACF;

Step 440, tunnel establishment: the CPE registers binding information to the MH-FE, and the MH-FE requests key material from the TAA-FE to check MIP signaling if the key doesn't exist in the MH-FE; after updating the record, the MH-FE notifies the TLM-FE of the current tunnel state.

The detailed attachment method of the CPE in NGN in the case of MIPv4 is as below:

Step 411: after the CPE attaches to the network, the CPE initiates an authentication and authorization request; the CPE may be identified by a NAI so that the HoA and an HA address can be allocated dynamically, and the CPE is required to provide a credential, such as a shared key or a digital certificate, to the TAA-FE;

Step 412: the TAA-FE inquires user profile information, such as key material, HoA, and HA address etc., of the TUP-FE, so that the TAA-FE can authenticate the CPE according to the user profile information;

Step 413: after the authentication succeeds, if the HoA and HA field in the request is set as ALL-ZERO-ONE-ADDR, then the TAA-FE can dynamically discover the HoA and HA address in the HA;

Step 414: the TAA-FE allocates the key to the MH-FE and MA-FE, and the MH-FE establishes MSA with the CPE;

Step 415: the TAA-FE returns an authentication and authorization response to the CPE, where the response contains a random value from which the CPE derives the key, the HoA and HA address;

Step 421: the NAC-FE allocates an IP address, i.e. the coexistent CoA, for the CPE by Point to Point Protocol (PPP), Internet Protocol Control Protocol (IPCP), or DHCP;

Step 422: if IP setting is not performed with the method of step 421, the CPE may interchange an MIP request or announcement message with the MA-FE to acquire the FA CoA;

Step 431: the CPE registers location information to the TLM-FE via the TAA-FE;

Step 432: the TLM-FE pushes profile information containing the location to the RACF;

Step 441: the CPE constructs a Registration Request (RRQ) message according to the NAI, CoA and HoA, and registers binding to the MH-FE via the MA-FE;

Step 442: the MH-FE may check MIP signaling by using the key allocated by the TAA-FE; if the key does not exist in the MH-FE, the MH-FE sends an access request to the TAA-FE, and the TAA-FE returns an access response containing a shared key to the MH-FE, thereby the MH-FE can check the MIP RRQ signaling;

Step 443: the MH-FE notifies the TLM-FE of the current tunnel state after updating the binding record;

Step 444: the TLM-FE pushes the user profile information to the RACF;

Step 445: the MH-FE sends an MIP Registration Reply (RRP) to the MA-FE, and then the MA-FE forwards the message to the CPE.

The above embodiments are merely preferred embodiments provided for sufficiently illustrating the present invention and the protection scope of the present invention is not limited thereto. Equivalent replacements or alterations made by those skilled in the art on the basis of the present invention shall all fall into the protection scope of the present invention. The protection scope of the present invention is defined by the claims.

INDUSTRIAL APPLICABILITY

The present invention configures a transport authentication and authorization functional entity and a mobile agent functional entity in the network, and defines a reference point between the transport authentication and authorization functional entity and the mobile agent functional entity to transfer a key, and the mobile agent functional entity requests key material from the transport authentication and authorization functional entity and performs security protection for signaling of a terminal according to the key material, thereby ensuring mobility security on transport layer in the NGN. Therefore the present invention has great industrial applicability.

What is claimed is:

1. A method for supporting mobility security in a next generation network, comprising:
    configuring a Transport Authentication and Authorization Functional Entity (TAA-FE) and a mobile agent functional entity in the network, and establishing a reference point for transmitting key material between the TAA-FE and the mobile agent functional entity; and
    when a terminal moves, the mobile agent functional entity receiving the key material from the TAA-FE, and performing security protection for signaling between the terminal and the mobile agent functional entity according to the key material;
    wherein the mobile agent functional entity comprises a Mobile Access Functional Entity (MA-FE) and a Mobile Home Functional Entity (MH-FE);
    the method further comprising: when the terminal moves, terminal customer premises equipment attaching to the network, the attachment comprising:
    a step of authentication and authorization: the terminal initiating an authentication and authorization request and providing a credential to the TAA-FE; the TAA-FE inquiring user profile information of a Transport User Profile Functional Entity (TUP-FE), and authenticating the terminal according to the user profile information; if the authentication succeeds, the TAA-FE sending a key to the MH-FE and MA-FE; and the MH-FE establishing mobile security association with the terminal;
    a step of Internet Protocol (IP) configuration: the TAA-FE returning an authentication and authorization response to the terminal, the authentication and authorization response containing a random value from which the terminal derives the key, a dynamic Home Address (HoA), and a Home Agent (HA); the terminal acquiring a Care-of Address (CoA);
    a step of location management: the terminal registering location information to a Transport Location Management Functional Entity (TLM-FE), and the TLM-FE sending the information to a Resource Admission Control Function (RACF); and
    a step of tunnel establishment: the terminal constructing a Registration Request (RRQ) message according to a Network Access Identifier (NAI) and the CoA and HoA, and registering binding to the MH-FE; the MH-FE authenticating Mobile IP (MIP) signaling of the terminal according to the key sent by the TAA-FE, and after the authentication is passed, the MH-FE notifying the TLM-FE of a current tunnel state and sending a MIP Registration Reply (RRP) message to the terminal via the MA-FE.

2. The method of claim 1, wherein in the step of authentication and authorization, the credential provided by the terminal to the TAA-FE contains a shared key and a digital certificate.

3. The method of claim 1, wherein in the step of IP configuration, the terminal acquires the CoA by one of the following approaches:
    a Network Access Configuration Functional Entity (NAC-FE) allocating an IP address, which is a coexistent CoA, to the terminal;
    the terminal acquiring a foreign agent CoA by interchanging an MIP request or announcement message with the MA-FE.

4. The method of claim 1, further comprising: in the step of tunnel establishment, after the TLM-FE receives the current tunnel state sent by the MH-FE, the TLM-FE sending the profile information to the RACF.

5. The method of claim 4, wherein the profile information comprises any one or combination of key material, HoA, HA, authentication and authorization, IP configuration and location.

6. A system supporting mobility security in a next generation network, comprising at least one hardware processor executing a Transport User Profile Functional Entity (TUP-FE), a Transport Authentication and Authorization Functional Entity (TAA-FE) and a mobile agent functional entity, wherein:
    the TUP-FE is configured to store user profile information;
    the TAA-FE is configured to inquire user profile information of the TUP-FE after receiving an authentication and authorization request from a terminal, and to authenticate and authorize the terminal according to the inquired user profile information; and
    the mobile agent functional entity is configured to receive key material from the TAA-FE when the terminal moves and perform security protection for signaling between the terminal and the mobile agent functional entity according to the key material;
    the mobile agent functional entity comprises a Mobile Access Functional Entity (MA-FE) and a Mobile Home Functional Entity (MH-FE), and wherein
    the TAA-FE is further configured to send a key to the MH-FE and MA-FE when the authentication succeeds; and the MH-FE is configured to establish mobile security association with the terminal;
    the TAA-FE is further configured to return an authentication and authorization response to the terminal, wherein the authentication and authorization response contains a random value from which the terminal derives the key, a dynamic Home Address (HoA), and a Home Agent (HA);

the TAA-FE is further configured to register location information of the terminal to a Transport Location Management Functional Entity (TLM-FE) which sends the information to a Resource Admission Control Function (RACF); and the MH-FE is configured to receive a Registration Request (RRQ) message constructed by the terminal according to a Network Access Identifier (NAI) and a Care-of Address (CoA) and the HoA, authenticate Mobile IP (MIP) signaling of the terminal according to the key sent by the TAA-FE, and notify the TLM-FE of a current tunnel state and send a MIP Registration Reply (RRP) message to the terminal via the MA-FE after the authentication is passed.

7. The system of claim 6, wherein
the MA-FE is configured:
to provide the CoA to the terminal and provide a routing service for the terminal;
to forward Mobile Internet Protocol (MIP) signaling of the terminal and authenticate the terminal; and
when the terminal is in active state, to interact with the RACF to request resources; and wherein the MH-FE is configured:
to send messages to a terminal away from home and maintain binding information of the terminal;
when the terminal access requires a dynamic home address and an MH-FE address, to provide the dynamic home address and MH-FE address to the TAA-FE;
to request key material from the TAA-FE to accomplish authentication of MIP signaling of the terminal or MA-FE;
to notify the TLM-FE of tunnel establishment information after creating a binding record; and
when the terminal is in active state, to interact with the RACF to request resources.

8. The system of claim 6, wherein the user profile information comprises any one or combination of key material, HoA, HA, authentication and authorization, IP configuration and location.

* * * * *